March 26, 1929. W. E. GERMER 1,706,848
ARRANGEMENT FOR THE MEASUREMENT OF LARGE VOLUMES OF
WATER FOR WATER TURBINES
Filed May 3. 1922
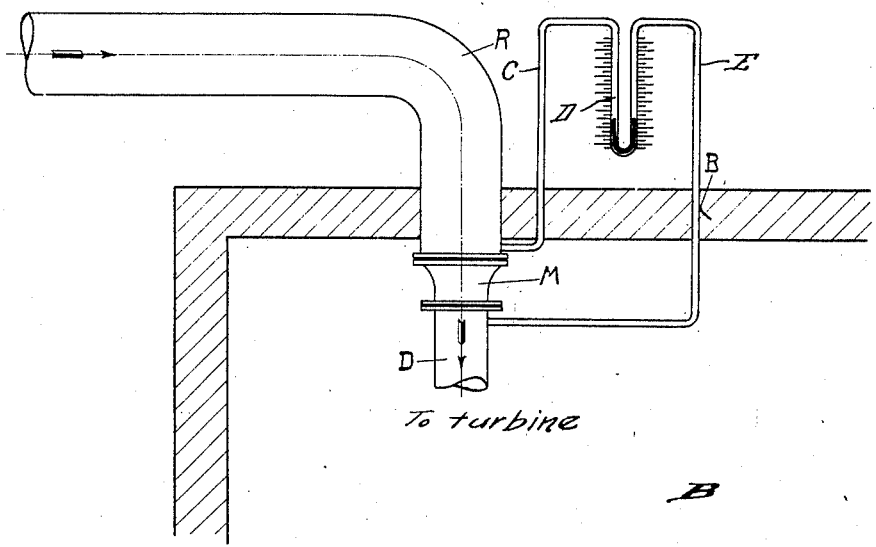
Witnesses:
Inventor:
Wilhelm Eduard Germer Patented Mar. 26, 1929.

1,706,848

UNITED STATES PATENT OFFICE.

WILHELM EDUARD GERMER, OF BERLIN-CHARLOTTENBURG, GERMANY.

ARRANGEMENT FOR THE MEASUREMENT OF LARGE VOLUMES OF WATER FOR WATER TURBINES.

Application filed May 3, 1922, Serial No. 558,216, and in Germany May 6, 1921.

The supervision of the efficiency of water turbines requires an exact determination of the water which is used for each individual unit. The pressure pipe lines have generally a comparatively large diameter, so that only measuring instruments for closed conduits can be used. The measurement with the Pitot tube is tedious and requires special practice when exact measurements shall be obtained. In most cases the water used by the turbine has been measured by means of an overflow weir inserted in the discharge channel. This method of measurement is however not suitable for carrying out a continuous supervision of the plant. The insertion of Venturi meters such as has already been carried out in some instances in larger plants does not find the approval of the hydraulic engineers because the loss of head caused by the insertion of a Venturi meter destroys too great a part of the available power. In hydro-electrical plants the measurement of the water used becomes too expensive as the continuous loss of electrical energy connected therewith is too great.

The measurement of water by means of a Venturi apparatus causes at the narrowest part of the Venturi tube (the throat) a considerable increase of the velocity of the water. This increase in velocity takes place without nearly any loss of head. A loss is only caused in the expanding cone of the tube where the increased velocity of the water used for measuring purposes is again converted into static pressure. At the end of the high pressure conduit the static water pressure is then finally converted into velocity so as to yield its entire kinetic energy to the turbine wheel.

Now the object of the present invention is to avoid as much as possible for measuring purposes the loss of head due to the insertion of a Venturi meter. Keeping in mind that for the utilization of the kinetic energy in the water a conversion is necessary of the static pressure into velocity and considering that in a Venturi meter the measurement is also obtained by such a conversion it is possible to combine both effects with the same conversion. As the said conversion of static pressure into velocity can be performed nearly without loss of head the measurement is made possible almost without a loss of power. In this arrangement it is not necessary to convert the velocity again into static pressure as is done in the ordinary Venturi meter where it can only be carried out with a certain loss of head.

The figure of the accompanying drawing shows diagrammatically one form of embodiment of this invention. The large turbine conduit R is reduced in diameter immediately after entering the power house B and all that is necessary is to insert at this contracted part of the conduit a correctly shaped measuring nozzle M. An increased velocity is therefore given to the water at this place and will be still more increased at the discharge end of the conduit to obtain the required final velocity at the turbine wheel. As readily seen a part of the velocity necessary for the production of power is created for measuring purposes a short distance from the discharge end without it being necessary to reduce it again. The frictional loss due to the increase of velocity does not matter as the remaining part of the conduit is only short.

The larger side of nozzle M is connected by means of small pipe C with an indicating device such as for instance a U-tube manometer D, the other side of the latter being connected by means of a small pipe E with the smaller side of nozzle M.

Having now fully described my invention, what I claim and desire to secure by Letters Patent is:

The combination with a main water turbine conduit of a section for directly delivering the water to the turbine, said section having an opening of uniform diameter which is less than that of the main conduit, a pressure measuring device and means causing the differential pressure produced by such reduction of diameter to act upon said measuring device, substantially as and for the purpose set forth.

In testimony of which I have hereunto set my hand this 12th day of April A. D. 1922.

WILHELM EDUARD GERMER. [L. S.]